S. PAVONARIUS & C. C. MICHTLE.
Fish-Traps.

No. 141,588. Patented August 5, 1873.

Witnesses.
Chas. B. Steele
Phill. Masi.

Inventor.
Samuel Pavonarius,
Charles C. Michtle,
Chipman Hosmer & Co,
attys.

UNITED STATES PATENT OFFICE.

SAMUEL PAVONARIUS AND CHARLES C. MICHTLE, OF PHILADELPHIA, PA.

IMPROVEMENT IN FISH-TRAPS.

Specification forming part of Letters Patent No. 141,588, dated August 5, 1873; application filed May 17, 1873.

*To all whom it may concern:*

Be it known that we, SAMUEL PAVONARIUS and CHARLES C. MICHTLE, of Philadelphia, in the county of Philadelphia and State of Pennsylvania, have invented a new and valuable Improvement in Fish-Traps; and we do hereby declare that the following is a full, clear, and exact description of the construction and operation of the same, reference being had to the annexed drawings making a part of this specification and to the letters and figures of reference marked thereon.

Figure 1:
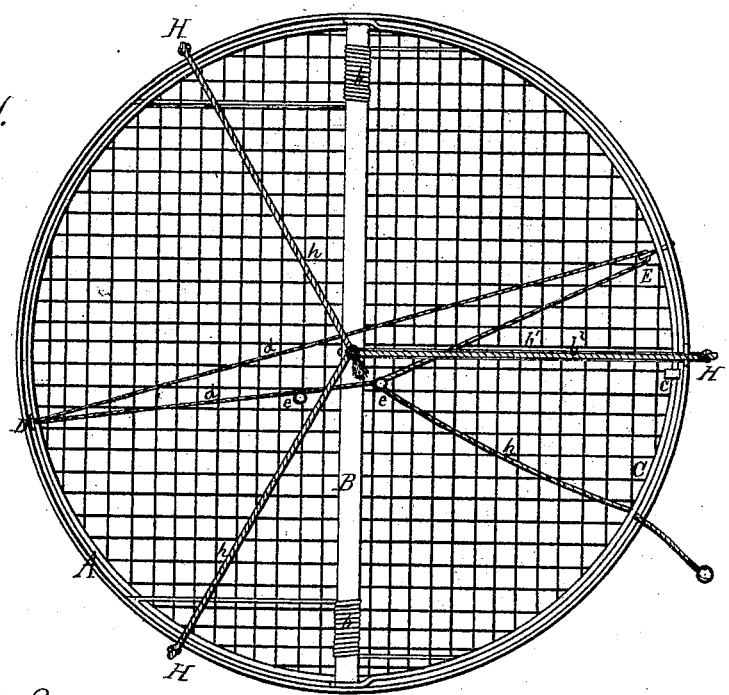
Figure 2:
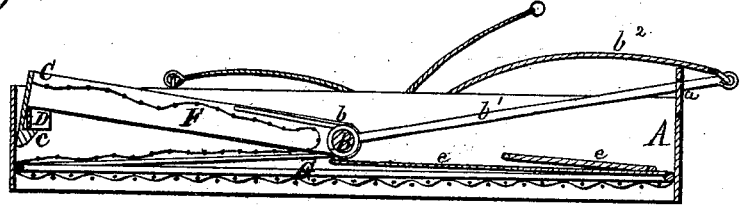

Figure 1 of the drawings is a representation of our improved fish-trap by a top view. Fig. 2 is a vertical cross-section of the same.

Our invention relates to fish-traps; and it consists of a cylindrical frame with a semicircular trap-door swinging on a diametrical rod in the said frame, on which rod the actuating springs are fastened, a sear-spring on the frame, and catch-hook on the trap-door, and a diametrical bait-string fastened to the frame and to the end of the sear-spring, the frame and the trap-door being connected by net-work.

The object of our invention is to make a trap which does not injure the fish as the fish-hook does, and which gives no chance of escape, and which also requires no hard labor for setting or moving, nor watching.

In the drawings, A represents a cylindrical frame with a rod, B, passing diametrically through it. A semicircular frame, C, is so connected with the rod B that it may swing on it, and may fit into the frame A at either side. The frame C, which serves as a trap, is kept in one side of the frame A by two spiral springs, $b$, fastened to the shaft B with one end and to the trap C with the other end, thereby tending to keep the frame closed. The rod B is prevented from turning by a small rod, $b^1$, which is fastened to its center and passed through a slot, $a$, in the frame A, ending outside of it with a loop, to which a string, $b^2$, is tied. At the center of the bow and between the ends of the trap C is a hook, $c$, which, when the trap is open, catches on the spring D fastened to the frame A. To the free end of the spring D a string, $d$, is fastened, which runs across the frame to a loop on the frame A, and has rings, $e\ e$, fastened to it, to which the bait is attached. The frame and trap are covered with network of suitable material. Iron wire has answered very well for the bottom net, while the top net requires some flexible material. The whole frame may be horizontally suspended by the hooks or eyes H on the frame A with the aid of strings $h$.

When the trap is to be used the swinging frame C is turned over on the rod B until the hook $c$ catches under the spring D. The baits are attached to the rings $e\ e$, and the trap is immersed in the water by the strings $h$, while the string $b^2$ is dealt out somewhat tightly. As soon as the fishes nibble at the baits the string $d$ pulls the spring D away from the hook $c$, and the trap-door C is closed by the springs $b$ with a slam on the rod $b^1$, by which the string $b^2$ receives a jerk and the operator a warning that his object is accomplished.

What I claim as new, and desire to secure by Letters Patent, is—

The fish-trap, consisting of the cylindrical frame A, the rod B, the springs $b\ b$, the semicircular trap-door C, the hook $c$, the spring D, bait-strings $d$, and suitable net-work, substantially as specified.

In testimony that we claim the above we have hereunto subscribed our names in the presence of two witnesses.

SAMUEL PAVONARIUS.
CHARLES C. MICHTLE.

Witnesses:
ANDW. J. BOSWELL,
ISAAC H. JONES.